Nov. 7, 1944.                    H. H. HILE                 2,362,008
                              RESILIENT BEARING
                           Filed May 1, 1942          2 Sheets-Sheet 1
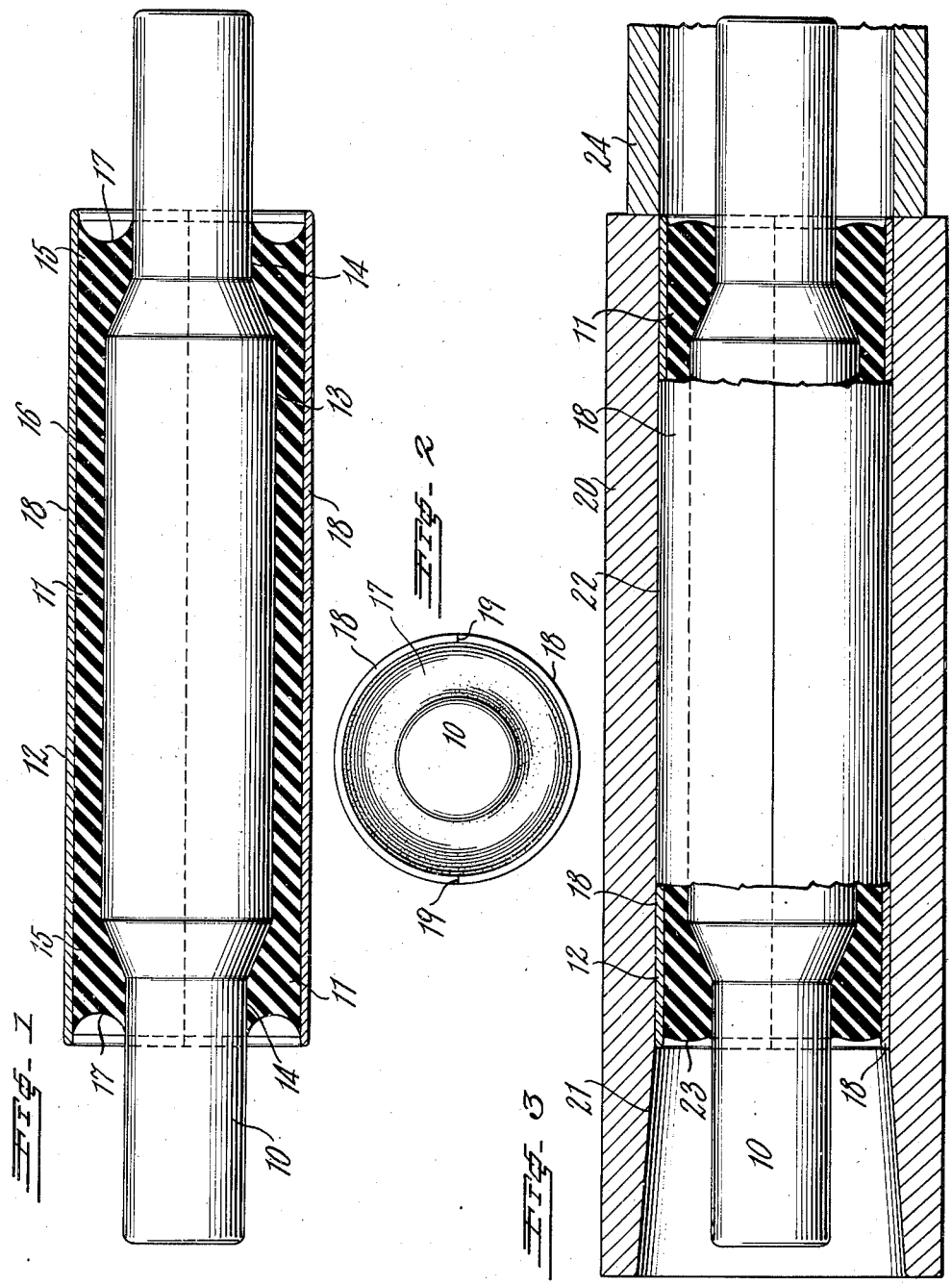
INVENTOR.
HESTON H. HILE
BY
*Lester G. Dudley*
ATTORNEY

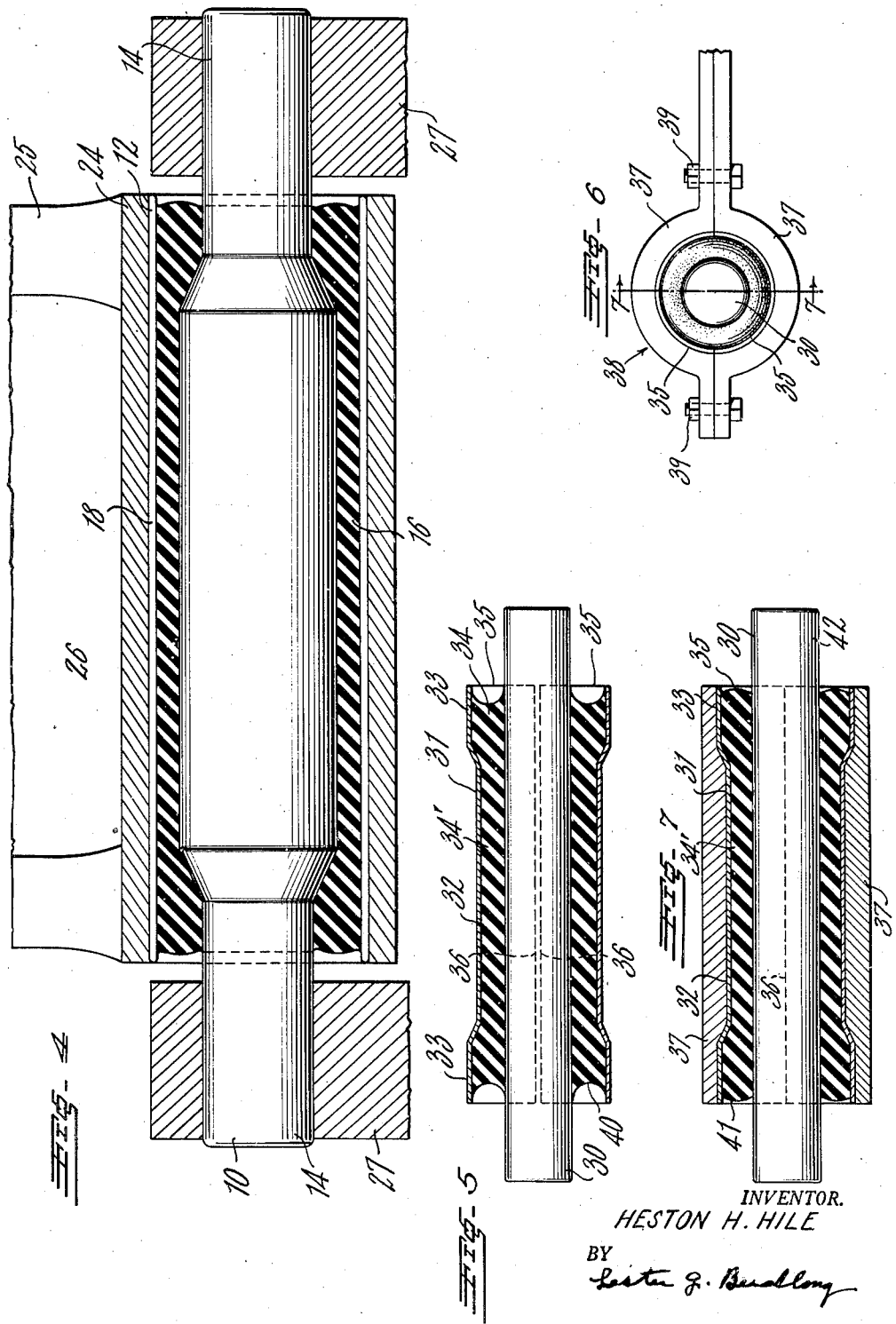

Patented Nov. 7, 1944

2,362,008

UNITED STATES PATENT OFFICE 2,362,008

RESILIENT BEARING

Heston H. Hile, Riverside, Conn., assignor to United States Rubber Company, New York, N. Y., a corporation of New Jersey Application May 1, 1942, Serial No. 441,329

4 Claims. (Cl. 287—85)

This invention relates to an improved resilient bearing comprising an inner supporting member floated on rubber within an outer supporting member. The invention relates particularly to such a bearing of the cylindrical type and the method of making same in which the rubber is bonded to the inner and outer members and is so designed as to reduce the internal tensile stresses in the rubber at the end regions and thereby increase the life of the rubber and the bond between it and the supporting members at the end regions.

Bearings embodying this invention are particularly useful as torsional bearings wherein the load is applied to the rubber in a radial direction which places the rubber under compression, and wherein there may also be an oscillating movement between the outer and inner supporting members which subjects the rubber to torsional stresses. However, the bearing may be used where the load is applied thereto in an axial direction whereby the rubber is stressed in shear in such direction. The shearing stresses may be accompanied by torsional stresses produced by an oscillating movement between the outer and inner supporting members.

Heretofore resilient bearings of the cylindrical type having an inner metal member floated in rubber within an outer metal member have failed because the rubber in the end regions has been subjected to too great tensile stress in normal operation. When the rubber is bonded to the inner and outer members, such stresses cause the bond between the rubber and the metal to fail, and when the exposed end surfaces of the rubber are also subjected to abrasion, these surfaces as well as the bond are caused to deteriorate more rapidly than when such end surfaces contain compressive stresses, or are at least free from tensile stresses.

In accordance with this invention the initial and working tensile stresses in the rubber at the end regions are reduced or eliminated by providing relatively thick walls of rubber between the inner and outer supporting members in the end regions of the bearing and a relatively thin wall of rubber between such members in the portion of the bearing between the end regions, the thin wall having a relatively large bearing or supporting surface. As the thin wall of rubber does not flow as readily as a thick wall under the same pressure, the intermediate thin wall carries substantially all of the load and reduces the pressure on the rubber in the end regions and the outward flow of rubber therein and the tensile stresses that would result from such pressure and flow under working conditions.

In order to further reduce the tensile stresses in the rubber in the end regions, the rubber is bonded to the supporting members and is subjected to an initial radial pressure so as to reduce the flow of the rubber for a given load, and the end surfaces of the rubber are initially molded with annular recesses so that the rubber flows into such recesses under the initial pressure and places compressive stresses in the exposed rubber end surfaces.

The bearing embodying this invention has an additional advantage as the larger volume of rubber in the end regions reduces the torsional stresses induced therein by the relative oscillating movement between the inner and outer supporting members. The torsional stresses may be further reduced for a given angle of oscillation by making the diameter of the ends of the inner member smaller than the intermediate portion.

This invention is described in greater detail in reference to the accompanying drawings in which:

Fig. 1 is a cross-sectional view through the longitudinal axis of the resilient bearing embodying this invention in its intermediate stage of manufacture;

Fig. 2 is an end view of the bearing shown in Fig. 1;

Fig. 3 is a side view of the bearing illustrating the method of its assembly, and showing parts in cross-section;

Fig. 4 is a cross-section view through the longitudinal axis of the completed bearing illustrated in connection with its mounting for actual use;

Fig. 5 is a longitudinal cross-sectional view of a modified form of an embodiment of this invention illustrating the bearing in its intermediate stage of manufacture;

Fig. 6 is an end view of the bearing shown in Fig. 5 in its completed form, and assembled for actual operation; and Fig. 7 is a longitudinal cross-sectional view of the assembled bearing shown in Fig. 6, and taken on the line 7—7 thereof.

The resilient bearing employing this invention is illustrated in the drawings and described herein in reference to a torsional bearing, in which the inner and outer supporting members are adapted to have a relative oscillating movement in respect to one another. In this connection the bearing is illustrated in Figs. 4 and 6 for use in tractor tracks. As hereinbefore explained, however, these bearings may also be used where the load is applied axially to the inner or outer member so as to subject the rubber interposed therebetween to shearing stresses, as opposed to torsional stresses when oscillating movement occurs between such members.

Referring to Fig. 1, the bearing comprises an inner cylindrical supporting member 10 which is floated on a cylindrical wall of rubber 11 within an outer cylindrrical supporting member 12. All of such members bear a concentric relation to each other. The inner member 10 has an intermediate portion 13 and reduced end portions 14 which project within the outer member 12, and are surrounded by the rubber 11. Accordingly, the bearing is provided with relatively thick walls of rubber 15 at each end and a relatively thin wall of rubber 16 at the intermediate portion of the bearing between the reduced ends 14 of the inner member. The thin wall of rubber 16 has a relatively large load supporting surface, and is preferably bonded to the inner and outer members. The rubber 16 is designed to carry substantially all of the load imposed on the bearing, so as to relieve the rubber 15 at the end of the bearing from as much of the load as is practical and the stresses and strains therein resulting from the load. To this end the walls of the intermediate portion 13 of the inner member 10 are substantially parallel to the diametrically opposed walls of the outer member 12, and the rubber therebetween is relatively thin and subjected to an initial radial pressure.

The rubber in its vulcanized state is initially formed with annular depressions 17 at each end of the bearing as shown in Fig. 1. In the manufacture of the mounting the rubber 11 is preferably molded between the inner and outer members 10 and 12 which are preferably made of metal, and the rubber is strongly bonded to the members 10 and 12 during the molding and vulcanizing process. The molding may be done in an ordinary split mold in which the unvulcanized rubber is placed around the inner member 10 and the semi-cylindrical parts 18 of the outer member 12 are placed around the rubber so that the longitudinal edges 19 of the parts 18 are in contact when assembled within the mold. Annular projections are provided in the mold at each end for the formation of the annular recesses 17 at the ends of the bearing.

After assembling the parts of the bearing in this manner in the mold, the rubber is vulcanized, and the bearing is removed from the mold. The rubber 11 is then subjected to the initial radial pressure, as illustrated in Fig. 3, by squeezing the bearing into a die 20, which is provided with a conical bore 21 at one end which merges into a cylindrical bore 22 of substantially uniform diameter at the smaller end of the cone. The outer member 12 is forced through the large end of the conical bore 21 and into the cylindrical bore 22 of smaller size by the pressure of a plunger (not shown) against the end of the member 12. In this operation the member 12 is shrunk to a smaller diameter, and the rubber 11 is caused to flow progressively from the central portion of bearing towards the end portions and into the depressions 17. Preferably, the reduction in the thickness of the rubber is sufficient to fill or substantially fill the depressions 17, as indicated at 23 in Fig. 3.

The bearing is then forced out of the die 20 into a bore in an outer holding shell 24. As shown in Fig. 4, the holding shell 24 is a part of a tread block 25 in a caterpillar track 26, in which the tread blocks 25 (only one of which is shown) are connected by links 27. The outer member 12 is forced into the bore of the member 24 under sufficient pressure to prevent relative movement between these parts. The links 27 are keyed, or fixed, to the reduced ends 14 of the inner member 10 and causes a relative oscillating movement between the members 10 and 12 when the caterpillar track is in operation.

The increased thickness of the wall of rubber at the outer ends of the mounting may be obtained by enlarging the diameter of the ends of the outer member as shown in the modification of the bearing in Figs. 5 to 7. In this construction the inner member 30 is provided with a uniform diameter and the outer member 31 has a reduced portion 32 between its enlarged ends 33. The inner member 30 is floated on rubber 34 within the outer member which is made preferably in two longitudinal sections 35. The rubber may be molded between the inner and the outer members 30 and 31 substantially in the manner described in reference to the molding of the rubber in the bearings illustrated in Figs. 1 to 3, excepting when the bearing is assembled in the mold the longitudinal edges 36 are spaced apart when the rubber completely fills the space between the inner and outer members in the mold. After the rubber is vulcanized and the bearing is removed from the mold, the rubber is placed under radial pressure by clamping the halves 35 of the outer member 31 between halves 37 of a caterpillar tractor tread block, or other split or separable mounting as shown in Fig. 6. The radial pressure is applied by the bolts 39 until the longitudinal edges 36 and the outer member 31 are brought together and the rubber is squeezed out at the ends of the bearing until it extends into the depressions 40 as shown in Fig. 7, at 41. Links (not shown) may be keyed to the reduced ends 42 of the inner member 30 so as to connect the tractor tread blocks 38 with one another. Such connection causes oscillatory movements between the inner and outer members 30 and 31 when the track goes around the driving and supporting wheels.

In the operation of the bearings disclosed in the drawings the intermediate portions of the rubber 16 in Figs. 1 to 4, and 34' in Figs. 5 to 7 are under initial radial compression and are made relatively thin as compared with the thickness of the rubber at the ends of the bearing. Consequently, the intermediate portions of the bearing carry substantially all of the load imposed thereon whether or not the rubber in the bearing is subjected to torsional or shearing stresses, and the excessive stresses on the rubber at the ends of the bearing are eliminated. The rubber being made relatively thick at the ends, such rubber is capable of being subjected to a greater percentage of displacement without reaching the rupture point of the bond between it and the supporting members, or the tearing point of the rubber. Furthermore, due to the rubber being forced into the annular depressions 17 and 40 at the ends of the bearing, the exposed surface of the rubber is subjected to compressive stresses, which imparts to such surface a greater resistance to abrasion and tear. The abrasive resistance is particularly important where the bearing is used on caterpillar tractor tracks, because the dirt and grit come in contact with such surfaces, and may be ground against the surface by the relative movement between the tractor links and the tread blocks.

While selected forms of this invention have been described herein, it will be understood that changes in the details may be made without departing from the spirit and the scope of this invention, and it is desired to claim it as broadly as the prior art permits.

Having thus described my invention, what I claim and desire to protect by Letters Patent is:

1. A resilient bearing comprising an outer cylindrical shell, an inner cylindrical member, a cylindrical rubber bushing interposed between said outer shell and inner member, said bushing having thicker walls in its end portions than in its intermediate portion between the thicker end portions, the walls of said intermediate portion of said bushing being of substantially uniform thickness from end to end, the walls of said intermediate portion extending throughout its length completely around said inner member, and the walls of said intermediate portion of said bushing having considerably greater bearing surface than the total bearing surface of said end portions, said walls being subjected to greater initial radial pressure than said end portions of said bushing so as to cause said walls of said intermediate portion to support substantially all of the load imposed on said bearing, and the end walls of said bushing having circumferential grooves formed therein prior to the application of said radial pressure and the rubber being forced into said grooves by said pressure.

2. A resilient bearing comprising an outer metal shell, a metal pin extending within said shell, a resilient rubber bushing having end portions and an intermediate portion interposed between and bonded to said shell and said pin, said end and intermediate portions of said bushing completely surrounding said pin throughout the length of said portions, the walls of said end portions being substantially thicker than the walls of said intermediate portion, said walls of said intermediate portion being of substantially uniform thickness and being relatively long and thin as compared to said thicker end portions, said bushing being subjected to an initial radial pressure, and the length of said intermediate portion of said bushing and the initial radial pressure thereon being sufficient to support the normal load imposed on the bearing without excessive wobble or radial movement of said pin in respect to said shell.

3. A bearing comprising an outer cylindrical metal member, an inner cylindrical metal member concentric to said outer member and spaced therefrom, the radial distance between the walls of said outer and inner members being greater at the end portions than at the intermediate portions of said members, the radial distance between the walls of said intermediate portions of said members being substantially the same for a substantial length of said members, to provide a relatively large bearing surface and a cylindrical rubber member bonded to the opposed surfaces of said metal members and subjected to initial radial pressure between said end and intermediate portions of said metal members, said ends of said cylindrical rubber member having circumferential grooves formed therein prior to the application of said radial pressure and the rubber being forced into said grooves by said pressure and the exposed rubber at the ends of the bearing being free from initial tensile stresses.

4. A resilient bearing comprising an outer cylindrical metal shell having a substantially uniform internal diameter, a metal pin extending within said shell, a resilient rubber bushing interposed between and bonded to said shell and said pin, said pin having reduced ends projecting from and extending into said shell for a short distance, said pin having a larger intermediate portion of substantially uniform diameter extending between said reduced ends, said rubber bushing completely surrounding said intermediate portion and at least a portion of said reduced ends within said shell, said rubber bushing being subjected to an initial radial pressure, and the length of said intermediate portion of said pin and the initial radial pressure on the rubber around said intermediate portion being sufficient to support the normal load imposed on the bearing without excessive wobble or radial movement of said pin in respect to said shell.

HESTON H. HILE.